United States Patent [19]

Takaoka et al.

[11] Patent Number: 4,507,358

[45] Date of Patent: Mar. 26, 1985

[54] INSULATING PAPER SHEET OF SYNTHETIC RESIN FLAKES AND NATURAL FIBERS

[75] Inventors: Michio Takaoka; Tsuneaki Moutai; Isao Miura, all of Tokyo, Japan

[73] Assignee: The Fujikura Cable Works, Limited, Tokyo, Japan

[21] Appl. No.: 328,580

[22] PCT Filed: Apr. 1, 1980

[86] PCT No.: PCT/JP80/00057

§ 371 Date: Nov. 30, 1981

§ 102(e) Date: Nov. 30, 1981

[87] PCT Pub. No.: WO81/02944

PCT Pub. Date: Oct. 15, 1981

[51] Int. Cl.[3] ........................ B32B 27/32; D21H 5/12

[52] U.S. Cl. .................................... 428/298; 428/303; 428/402; 428/326; 428/338; 428/513; 428/537.5; 162/168.1; 162/164.1

[58] Field of Search ............... 428/336, 338, 513, 537, 428/402, 298, 303; 162/146, 168 R, 168.1, 164.1

[56] References Cited

U.S. PATENT DOCUMENTS

| | | | |
|---|---|---|---|
| 2,765,247 | 10/1956 | Graham | 428/338 X |
| 3,271,231 | 9/1966 | Moggio et al. | 428/338 X |
| 3,745,060 | 7/1973 | Jumentier et al. | 428/338 |
| 3,855,056 | 12/1974 | Maeda et al. | 162/146 X |
| 3,904,804 | 9/1975 | Tabara et al. | 162/146 X |
| 3,953,282 | 4/1976 | Tabara et al. | 162/146 X |
| 4,092,457 | 5/1978 | Fujita et al. | 428/513 X |
| 4,273,825 | 6/1981 | Nishiyama et al. | 428/402 |

FOREIGN PATENT DOCUMENTS

| | | | |
|---|---|---|---|
| 18000 | 2/1978 | Japan | 428/402 |

*Primary Examiner*—Patricia C. Ives

*Attorney, Agent, or Firm*—Schwartz, Jeffery, Schwaab, Mack, Blumenthal & Koch

[57] ABSTRACT

This invention provides an insulating paper sheet produced by mixing synthetic resin flakes with natural fibers to provide a composite paper mass. This insulating paper sheet is favorably accepted as an insulating member for covering the conductor of a power cable.

2 Claims, 4 Drawing Figures

INSULATING PAPER SHEET OF SYNTHETIC RESIN FLAKES AND NATURAL FIBERS

TECHNICAL FIELD

This invention relates to an insulating paper sheet and more particularly to an insulating paper sheet for a power cable.

BACKGROUND ART

Recently, synthetic fiber, synthetic resin film or such film laminated with insulating paper, like kraft paper, is applied as insulation material of low power loss or low dielectric loss for use with an ultrahigh voltage, oil filled cable intended for large capacity transmission line.

However, synthetic resin film, for example, has the drawbacks that it has low chemical resistance to insulation oil conducted through the above-mentioned cable. The film, when impregnated with oil, swells and tends to increase oil flow resistance, and readily gives rise to buckling and creases when the cable is bent. Where the synthetic resin film is applied in combination with insulating paper, then the combined mass does indeed produce a smaller increase in physical resistance to oil flow resulting from swelling, but is still accompanied with the drawbacks that when swelling, the combined mass obstructs radial oil flow within the cable insulation and shows a noticeable polar effect on an impulse breakdown voltage.

It is accordingly an object of this invention to provide an insulating paper sheet having excellent electric and mechanical properties and great ease of handling.

Another object of the invention is to provide insulating paper for a power cable which is free of the above-mentioned drawbacks accompanying the conventional art insulating paper.

DISCLOSURE OF THE INVENTION

According to an aspect of the invention, there is provided an insulating paper sheet prepared from a mixture of natural fibers and synthetic resin flakes.

According to another aspect of the invention, there is provided an insulating paper sheet which is formed by laminating with heat and pressure first and second insulating paper sheet components each prepared from a mixture of natural fibers and synthetic resin flakes, and in which the mutually facing portions of the laminated mass contains a larger amount of synthetic resin flakes than the other portions of said mass.

BEST MODE OF CARRYING OUT THE INVENTION

An insulating paper sheet embodying this invention is manufactured in the following manner. First, there are provided natural fibers like those of kraft pulp. The insulating paper sheet is prepared by adding synthetic resin flakes to beaten kraft pulp. The ordinary paper-making machine is applicable in the production of said insulating paper sheet. Synthetic resin flakes are produced by crushing a synthetic resin film. The synthetic resin is preferrably to be polypropylene. In addition, ethylene tetrafluoride, polyethylene, polycarbonate, etc. may be used as synthetic resin material.

Figure 1:
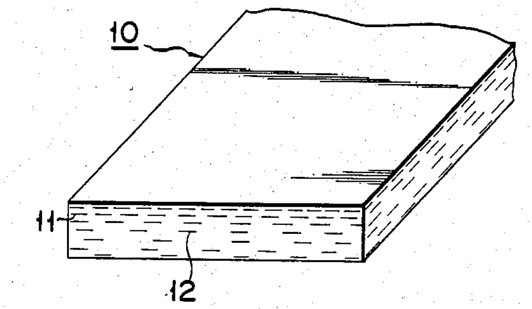
FIG. 1 is an oblique view of an insulating paper sheet embodying this invention.

The insulating paper sheet thus prepared is calendered to have an increase in density or impermeability, a decrease in thickness and an increase in surface smoothness, and is further treated by heated press rolls to provide greater mechanical strength. The upper portion of a slurry consisting of a mixture of beaten pulp and synthetic resin flakes contains a larger amount of synthetic resin flakes lighter than said beaten pulp. Therefore, the upper portion 11 of an insulating paper sheet produced from the above-mentioned slurry by a Fourdrinier machine contains, as shown in FIG. 1, a larger amount of synthetic resin flakes than the other portion 12.

Figure 2:
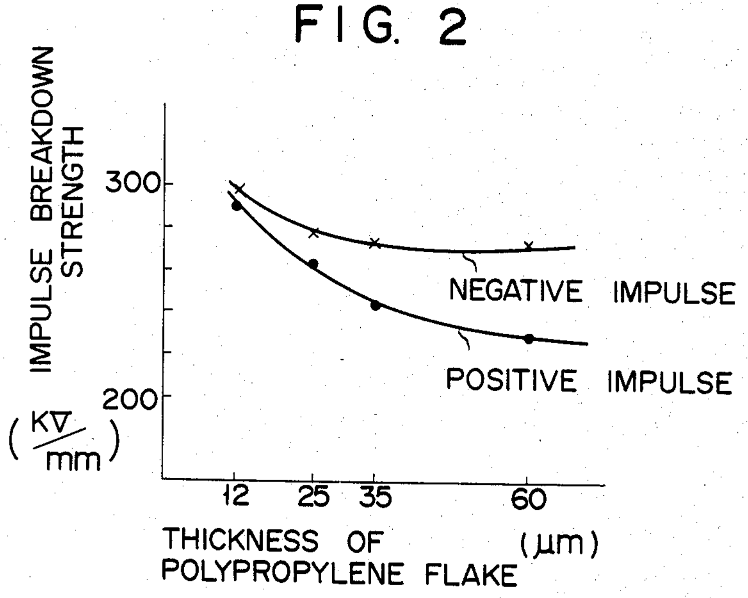
FIG. 2 graphically indicates the relationship between the thickness of a polypropylene flakes applied in the production of a power cable from an insulating paper sheet embodying this invention and impulse breakdown stress.

For the object of this invention, the insulating paper sheet 10 thus produced may be used by itself as insulation material for a power cable. However, that type of insulating paper sheet is more preferably applied which is prepared by laminating two insulating paper sheet components 10 with heat and pressure in such a manner that the portions of both insulating paper sheet components 10 which contain a larger amount of synthetic resin flakes are made to face each other.

Where an insulating paper sheet is manufactured by a cylinder machine instead of the Fourdrinier machine, then an insulating paper sheet is obtained in which synthetic resin flakes are uniformly distributed in natural fibers constituting pulp.

Where an insulating paper sheet is prepared with thin polypropylene flakes mixed with natural fibers in a prescribed ratio, then the resultant insulating paper sheet has a prominently increased positive impulse breakdown strength as illustrated in FIG. 2.

A description is now given of a specific insulating paper sheet embodying this invention. A polypropylene film is crushed into flakes having a thickness of 5 to 9 microns and a random shape whose length ranges between 2 and 5 mm.

FIG. 2 shows that the thinner the polypropylene flake, the greater the impulse breakdown strength. However, it is industrially difficult to reduce the thickness of the polypropylene flake to less than 5 to 9 microns.

Polypropylene flakes having an excessively large size are unevenly distributed in natural fibers, and the thus obtained insulating paper unduly swells by being soaked with cable insulation oil. Therefore natural fibers are obstructed in being twisted together by large polypropylene flakes, resulting in a decline in the mechanical strength of an insulating paper sheet.

Where the ratio is fixed in which synthetic resin flakes are to be mixed with natural fibers, then larger synthetic resin flakes are mixed with natural fibers in a smaller number, causing the resulting insulating paper sheet to decline in impulse breakdown strength. Conversely, extremely small synthetic resin flakes cause the insulating paper sheet to lose a barrier effect and have a reduce impulse breakdown voltage. Therefore, it is preferrable that the synthetic resin flakes have a length ranging between 2 to 5 millimeters.

A mixture of beaten kraft pulp fibers (having a length of about 3 mm and a width of about 0.03 mm) and polypropylene flakes having the above-mentioned length are made into a wet sheet using a paper making machine.

An insulating paper sheet is preferred to have a smaller dielectric constant than 2.8 in order to have a small dielectric loss. The ratio in which polypropylene flakes are to be mixed with natural fibers in order to meet the above-mentioned requirement is chosen to be 40 to 60% by weight.

Figure 3:
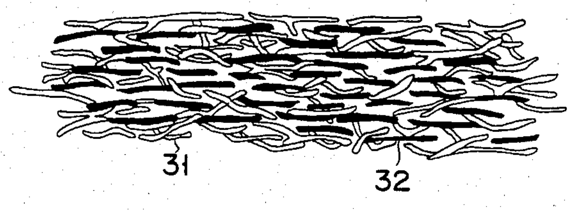
FIG. 3 is an enlarged view of the interior of the insulating paper sheet embodying the invention.

With a wet sheet manufactured by the aforementioned process of this invention, polypropylene flakes are irregularly arranged between natural fibers in the form of layers. Referring to FIG. 3, reference numeral 31 denotes natural fibers, and reference numeral 32 represents polypropylene flakes.

Calendering and subsequent application of heat and pressure cause the polypropylene flakes and natural fibers to adhere to each other, providing an insulating paper sheet embodying this invention which has increased mechanical strength.

Where an insulating paper sheet is produced by the Fourdrinier machine, polypropylene flakes lighter than natural fibers are gathered more in the upper portion of a wet sheet formed of their mixture than in the other portions of said sheet. Two insulating paper sheet components in each of which polypropylene flakes are gathered in a larger amount in the upper portion are laminated in such a manner that the upper portions of both laminated insulating paper sheet components face each other. The laminated mass is let to pass between heated press rolls at a temperature of 170° to 200° C. and a pressure of 50 to 200 kg/cm$^2$, thereby providing an insulating paper sheet embodying this invention. Obviously, the invention includes a product manufactured by laminating two insulating paper sheet components which are produced by the cylinder machine and in which synthetic resin flakes are evenly distributed in natural fibers and thereafter letting the laminated mass pass between heated press rolls.

Two insulating paper sheet components laminated with heat and pressure have a greater mechanical strength than two insulating paper sheet components simply superposed an each other. A laminated mass of insulating paper components embodying the invention contains a larger amount of mutually twisted natural fibers with synthetic resin flakes evenly distributed and can be wound about a cable conductor as easily as kraft paper, offering good handling property.

When two insulating paper sheet components are laminated together, synthetic resin flakes are more uniformly distributed through natural fibers.

Figure 4:
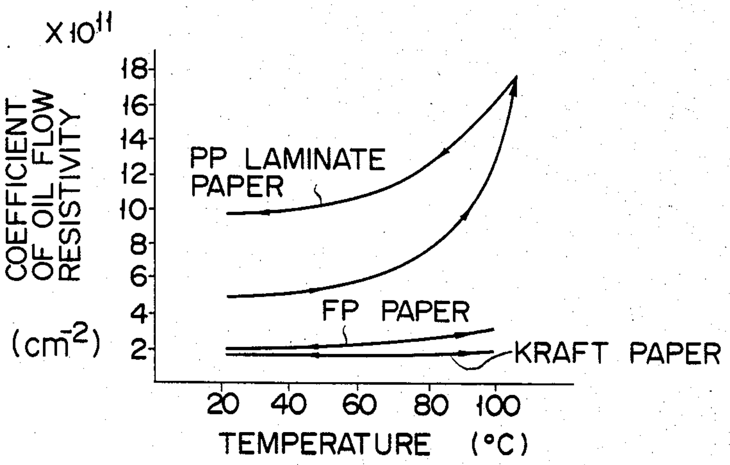
FIG. 4 graphically shows changes with temperatures in the oil flow resistance of various types of insulating paper sheets used in the manufacture of a power cable.

Concrete description is now given of the properties (see a table below) of an insulating paper sheet (hereinafter referred to as "FP") embodying this invention in which polypropylene flakes having a thickness of 9 microns are mixed with natural fibers in the ratio of 40%. Determination was made of the dielectric characteristic and dielectric breakdown characteristic of a model cable wound with an insulating paper sheet embodying this invention. The model cable had a length of 300 mm; the conductor had an outer diameter of 20 mm; and the insulating layer wound with the insulating paper had a thickness of about 1 mm. $\epsilon \times \tan\delta$ had a smaller value than one third that of the kraft paper. As compared with kraft paper, the insulating paper sheet of this invention is increased about 50% in an A.C. breakdown strength, and about 30% in an impulse breakage field. The insulating paper sheet of the invention does not indicate a polar effect in the impulse breakdown strength. The reason for this is that polypropylene flakes are contained in the insulation paper sheet in the form of a plurality of thin layers. When immersed in insulation oil (DDB, 100° C.), the FP insulating paper sheet of the invention indicated an extremely small degree of swelling, i.e., 0.4%. Where a cable is bent due to an increase in the internal pressure of an oil-impregnated insulating paper sheet resulting from its swelling, the insulating paper sheet of the invention is not very likely to give rise to bucking or creasing. Further, as shown in FIG. 4 the FP insulating paper sheet of the invention indicates substantially as small an oil flow resistance as the kraft paper and substantially as small a change with temperature in said oil flow resistance. PP laminate paper shown in FIG. 4 represents an insulating paper sheet prepared by laminating polypropylene film on a paper sheet. The PP laminate paper is higher in oil flow resistance than FP paper or Kraft paper and exhibits a large change with temperature in the oil flow resistance. Therefore, the transient oil pressure of a cable with the load variation temporarily changes only in a small degree, allowing for the application of the conventional oil feeding design.

TABLE

| Properties of an insulating paper sheet embodying this invention as compared with those of a kraft paper. | | | | |
|---|---|---|---|---|
| Item | | Unit | FP paper | Kraft paper |
| Paper thickness | | microns | 110 | 125 |
| Density | | g/cm$^3$ | 0.66 | 0.67 |
| Impermeability | | sec/100 cc | 2,500 | 1,500 |
| Weight ratio in which the polypropylene flakes are mixed with natural fibers | | % | 40 | — |
| Dielectric characteristics | $\epsilon_s$ | | 2.78 | 3.4 |
| | $\tan\delta$ | (%) | 0.078 | 0.22 |
| Dielectric breakdown strength | AC | kV/mm | 64 | 42 |
| | Imp − | | 145 | 112 |
| | + | | 148 | 116 |

An insulating paper sheet embodying this invention has the following advantages:

1. The subject insulating paper sheet in which synthetic resin flakes are mixed with natural fibers has a low dielectric loss.

2. Synthetic resin flakes are distributed in natural fibers in the form of a plurality of thin layers, improving the impulse breakdown characteristics of an insulating paper sheet and eliminating a polar effect on an impulse breakdown strength.

3. The subject insulation paper sheet in which synthetic resin flakes are mixed with natural fibers presents a smaller radial oil flow resistance in a power cable than an insulating paper sheet produced simply by laminating a synthetic resin film with a sheet of paper.

4. The swelling of synthetic resin soaked with insulation oil is reduced due to the coexistence of natural fibers.

5. Two insulating paper sheets are laminated with heat and pressure, enabling synthetic resin flakes to be more uniformly distributed through the natural fibers in the laminated mass.

6. A larger amount of natural fibers than synthetic resin flakes is gathered in the outer surfaces of a mass of two insulating paper sheet components laminated together with heat and pressure. Therefore, the laminated mass has the same surface condition as that of a kraft paper sheet, and can be wound about a cable conductor as easily as the kraft paper sheet.

INDUSTRIAL APPLICABILITY

An insulating paper sheet embodying this invention is favorably accepted as an insulation for a power cable as described above. However, the insulating paper sheet is not solely intended for such application but is usable as an electric insulation material for any other purpose.

We claim:

1. An insulating paper sheet which is produced by laminating first and second sheet components with heat and pressure, each of said sheet components being prepared by mixing synthetic resin flakes having a thickness of 5 to 9 microns and a length of 2 to 5 millimeters with natural fibers to provide a composite paper mass, said synthetic resin flakes being mixed with natural fibers in the weight ratio ranging between 4:6 and 6:4, and wherein the mutually facing portions of the laminated insulation paper sheet components contain a larger amount of synthetic resin flakes than in any other portion of the laminated mass.

2. The insulating paper sheet according to claim 1, wherein the synthetic resin is polypropylene.

* * * * *